(12) United States Patent
Weber

(10) Patent No.: US 9,890,654 B2
(45) Date of Patent: Feb. 13, 2018

(54) GAS DRIVEN MOTOR

(71) Applicant: Marc Weber, San Francisco, CA (US)

(72) Inventor: Marc Weber, San Francisco, CA (US)

(73) Assignee: Marc Weber, San Francisco, CA (US)

( * ) Notice: Subject to any disclaimer, the term of this patent is extended or adjusted under 35 U.S.C. 154(b) by 0 days.

(21) Appl. No.: 14/217,152

(22) Filed: Mar. 17, 2014

(65) Prior Publication Data

US 2014/0294569 A1 Oct. 2, 2014

Related U.S. Application Data

(60) Provisional application No. 61/800,242, filed on Mar. 15, 2013.

(51) Int. Cl.

| | |
|---|---|
| *F02B 53/00* | (2006.01) |
| *F02B 53/04* | (2006.01) |
| *F01C 1/00* | (2006.01) |
| *F01D 17/14* | (2006.01) |
| *F16H 19/06* | (2006.01) |
| *B62M 1/30* | (2013.01) |
| *B62K 3/00* | (2006.01) |

(Continued)

(52) U.S. Cl.
CPC .......... *F01D 17/141* (2013.01); *B62K 3/002* (2013.01); *B62M 1/28* (2013.01); *B62M 1/30* (2013.01); *F16H 19/06* (2013.01); *F16H 19/08* (2013.01); *Y10T 74/188* (2015.01); *Y10T 74/1884* (2015.01); *Y10T 74/18784* (2015.01)

(58) Field of Classification Search
CPC .......... F02B 53/00; F02B 53/02; F02B 53/04; Y02T 10/17; F01C 1/44; F01C 1/46; F02G 3/00; B62K 3/002; B62M 1/28; B62M 1/30; F01D 17/141; F16H 19/06; F16H 19/08; Y10T 74/18784; Y10T 74/188; Y10T 74/1884
USPC ....... 123/204, 243, 248, 231, 236, 237, 224; 60/39.61; 418/248–249, 255, 104, 12; 415/171.1
See application file for complete search history.

(56) References Cited

U.S. PATENT DOCUMENTS

| | | | | |
|---|---|---|---|---|
| 660,129 | A | * | 10/1900 | Standish ........................ 123/223 |
| 3,913,534 | A | * | 10/1975 | Bratten ..................... F01C 1/46 |
| | | | | 123/213 |

(Continued)

FOREIGN PATENT DOCUMENTS

DE          3239346 A1 *  4/1984  ............. F01C 1/344

*Primary Examiner* — Mark Laurenzi
*Assistant Examiner* — Anthony Ayala Delgado
(74) *Attorney, Agent, or Firm* — Kali Law Group, P.C.

(57) ABSTRACT

Gas driven motors are presented including: a housing defining a circulation chamber and a shutter chamber, where the housing includes an intake port and an exhaust port; a drive axle positioned along a pair of parallel circulation chamber walls and rotatably attached thereto, where the drive axle is perpendicular to the pair of parallel circulation chamber walls; a vane having an attached edge, a leading edge parallel with and opposite to the attached edge, and a pair of vane side edges, where the pair of side edges are parallel with respect to one another and form a matching curve with respect to one another, where the vane includes a curved surface defined by the pair of side edges, where the vane is mechanically coupled with the drive axle along the attached edge.

15 Claims, 7 Drawing Sheets

POSITION A          POSITION B          POSITION C

(51) Int. Cl.
*F16H 19/08* (2006.01)
*B62M 1/28* (2013.01)

(56) References Cited

U.S. PATENT DOCUMENTS

| | | | | |
|---|---|---|---|---|
| 5,163,825 | A | * | 11/1992 | Oetting ............... F01C 1/44 418/153 |
| 5,174,742 | A | * | 12/1992 | Putney ............... F01C 1/3442 418/152 |
| 5,217,160 | A | * | 6/1993 | Lopes ............... B05B 12/00 239/332 |
| 8,863,724 | B2 | * | 10/2014 | Shkolnik et al. ............ 123/205 |
| 2008/0141973 | A1 | * | 6/2008 | Shkolnik et al. ............ 123/234 |
| 2009/0064672 | A1 | * | 3/2009 | Rafalski, Jr. ............... F01B 1/08 60/413 |
| 2011/0083637 | A1 | * | 4/2011 | Blount ............... F01C 1/3442 123/220 |

* cited by examiner

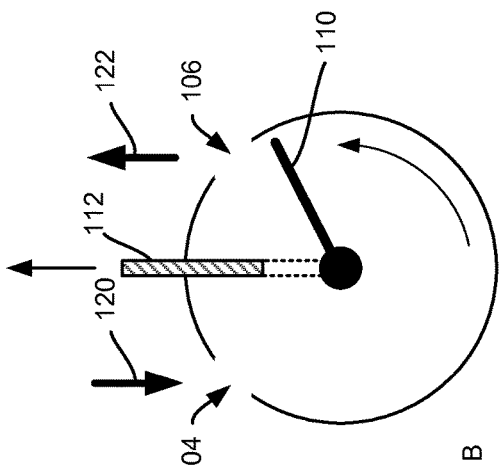
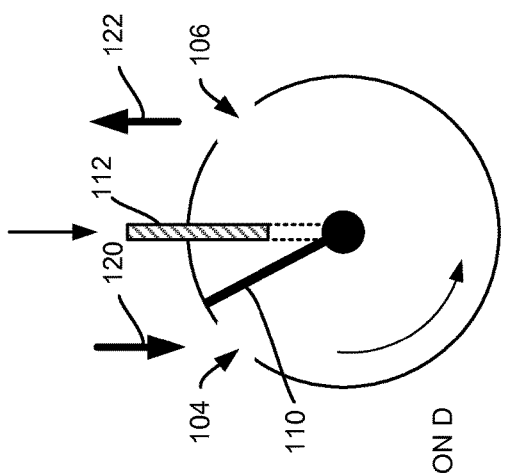
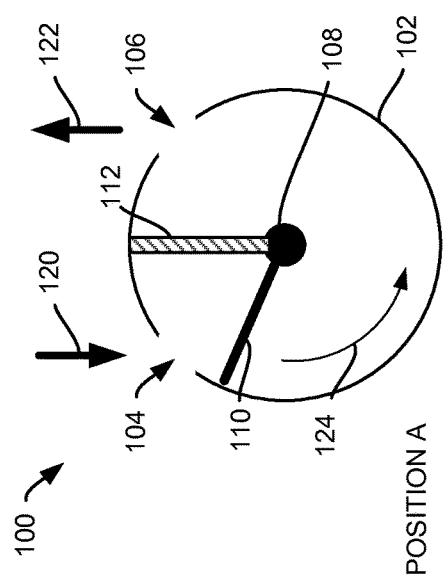
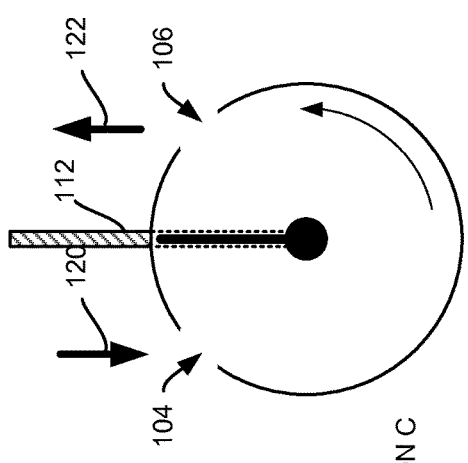
FIG. 1

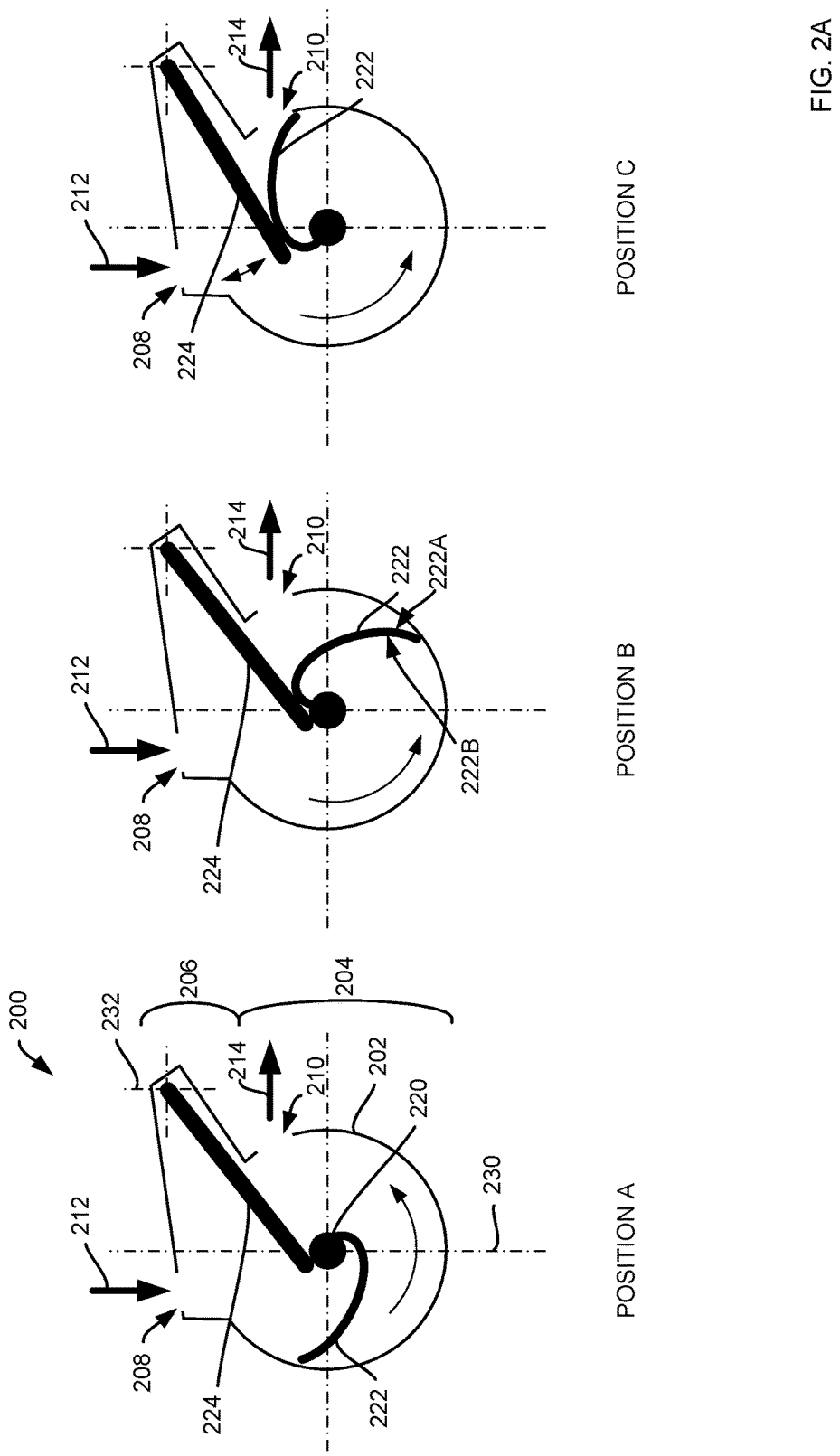

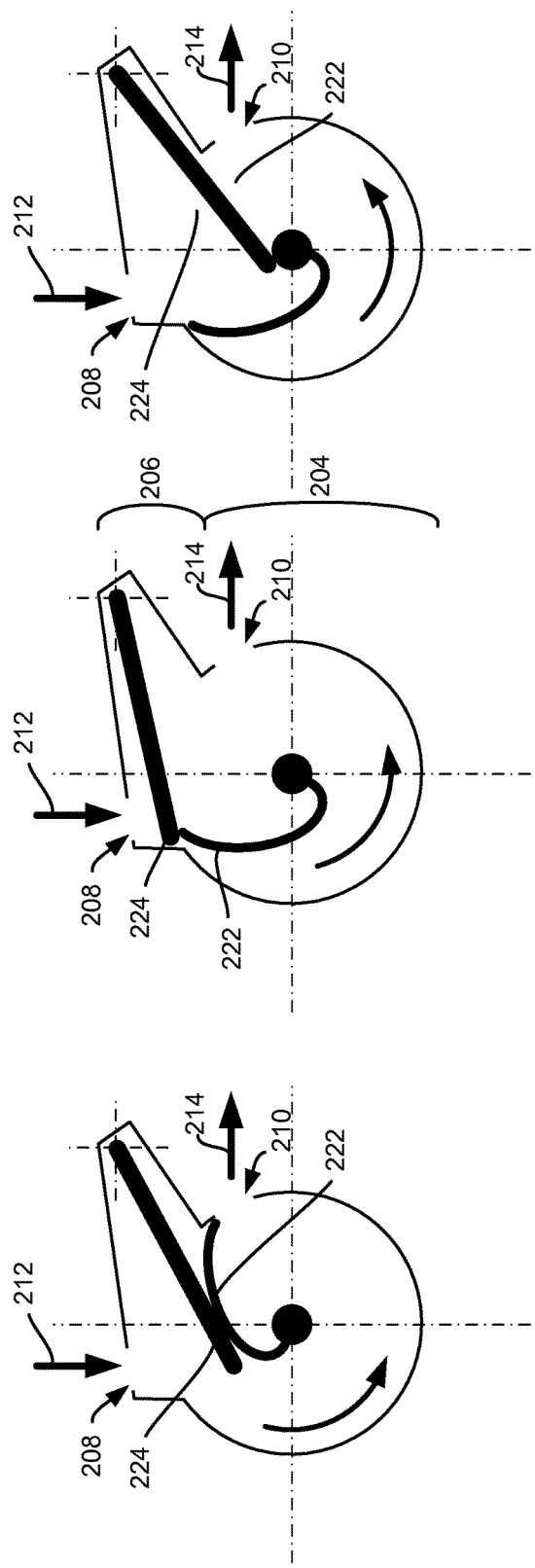

GAS DRIVEN MOTOR

BACKGROUND

There exist many examples of gas driven motors. Some conventional gas driven motors require high operating pressures exerted against a piston and include complex mechanical controls for gas intake and exhaust. These examples may provide high torque with a high gas pressure delivery system. Other conventional solutions may include simple vane arrangements attached with a rotating axle such as, for example, a windmill. In these examples, gas may be flowed across the vanes and provide low torque with a low gas pressure delivery system. It may be desirable to provide a gas driven motor that provides high torque with a low gas pressure delivery system. As such, gas driven motors are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, gas driven motors are presented including: a housing defining a circulation chamber and a shutter chamber, where the housing includes an intake port and an exhaust port; a drive axle positioned along a pair of parallel circulation chamber walls and rotatably attached thereto, where the drive axle is perpendicular to the pair of parallel circulation chamber walls; a vane having an attached edge, a leading edge parallel with and opposite to the attached edge, and a pair of vane side edges, where the pair of side edges are parallel with respect to one another and form a matching curve with respect to one another, where the vane includes a curved surface defined by the pair of side edges, where the vane is mechanically coupled with the drive axle along the attached edge, and where the vane is configured to rotate through the circulation chamber along an axis of rotation in response to an application of a gas flow; a shutter having a sealing edge, a pivoting edge parallel with and opposite to the sealing edge and a pair of shutter side edges, where the shutter is positioned along a pair of parallel shutter chamber walls and pivotally attached thereto, where the shutter pivotally extends into the circulation chamber in a first position, and where the shutter pivotally retracts into the shutter chamber in a second position. In some embodiments, gas driven motors further include: a flywheel mechanically coupled with the drive axle. In some embodiments, the intake port is positioned along an upper wall of the shutter chamber in a position corresponding with the sealing edge, and where the exhaust port is positioned along an upper portion of a circumferential wall of the circulation chamber. In some embodiments, the intake port and the exhaust port are oppositely positioned along upper portions of a circumferential wall of the circulation chamber.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an illustrative representation of a simplified operational cycle for a gas driven motor in accordance with embodiments of the present invention;

FIGS. 2A-2B are illustrative representations of an operational cycle for a gas driven motor in accordance with embodiments of the present invention;

DETAILED DESCRIPTION

Figure 3:
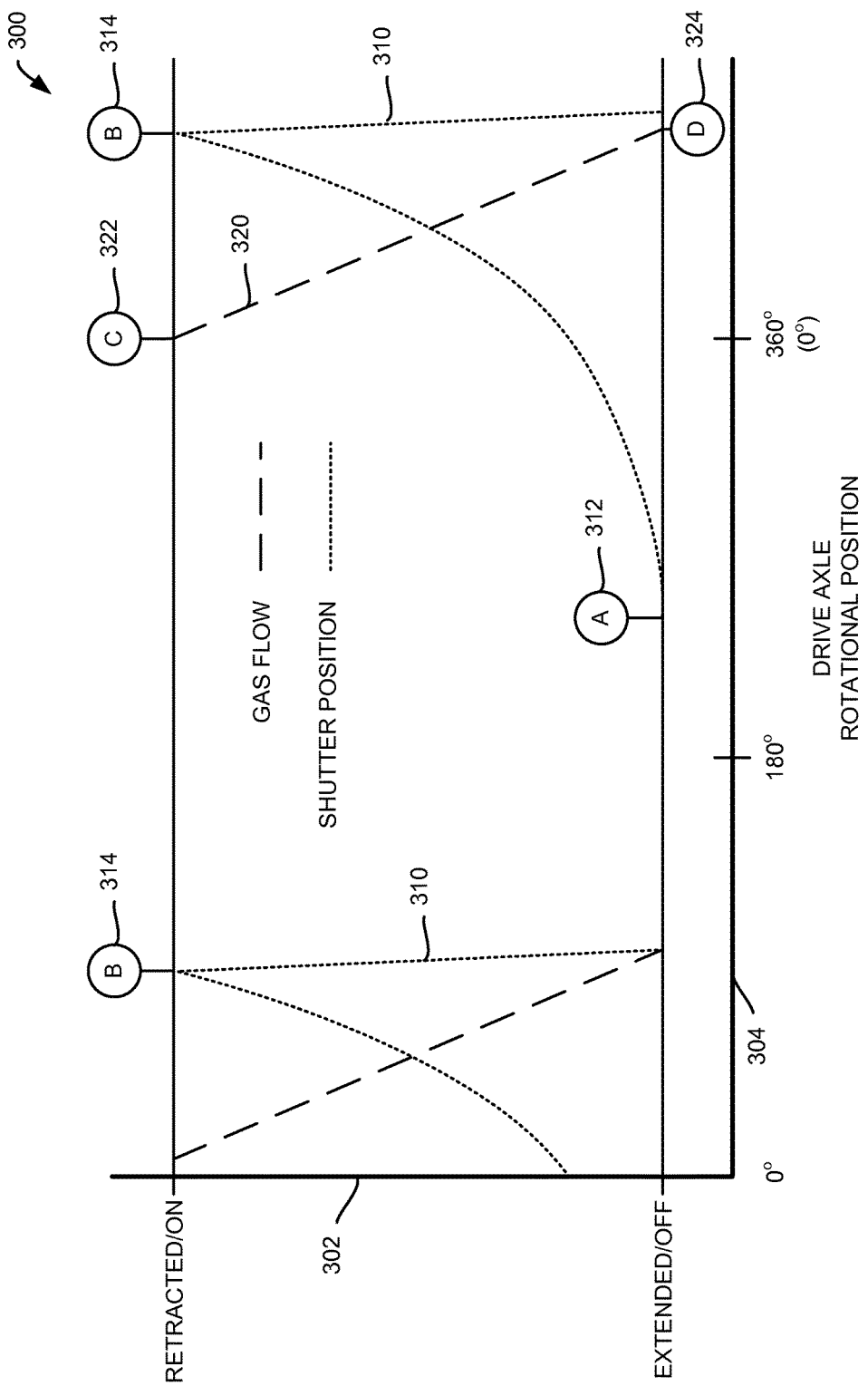
FIG. 3 is an illustrative graphical representation of shutter position and gas flow over drive axle rotational position of a gas driven motor in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

FIG. 1 is an illustrative representation of a simplified operational cycle for a gas driven motor in accordance with embodiments of the present invention. In particular, FIG. 1 illustrates a gas driven motor in four positions to illustrate the cooperative elements disclosed herein. As illustrated, gas driven motor 100, includes housing 102 that includes intake port 104 and exhaust port 106. It may be seen that housing 102 defines a circulation chamber through which compressed gas may flow. Gas driven motor further includes drive axle 108 that is supported by housing 102. Coupled with drive axle 108 is vane 110 that rotates through the circulation chamber. Further illustrated is shutter 112 that operates to divide circulation chamber so that gas flow from intake port 104 to exhaust port 106. Shutter 112 further operates to allow vane 110 to pass unobstructed through the circulation chamber. Arrows 120 and 122 illustrate intake gas flow and exhaust gas flow respectively and arrow 124 illustrates the direction that vane 110 rotates.

As seen in position A, gas flow 120 enters intake port 104 to rotate vane 110. Further in position A, shutter 112 is in a closed position and as flow 122 exits through exhaust port 106. As vane 110 rotates to position B, gas flow 120 continues entering intake port 104 to rotate vane 110. Further in position B, shutter 112 is in a partially open position and gas flow 122 continues exiting through exhaust port 106. As vane 110 rotates to position C, gas flow 120 continues entering intake port 104 to rotate vane 110. Further in position C, shutter 112 is in a fully open position allowing vane 110 to pass unobstructed while gas flow 122 continues exiting through exhaust port 106. As vane 110 rotates to position D, gas flow 120 continues entering intake port 104 to rotate vane 110. Further in position D, shutter 112 is in a partially closed position and gas flow 122 continues exiting through exhaust port 106.

FIG. 2A is an illustrative representation of a portion of an operational cycle for a gas driven motor 200 in accordance with embodiments of the present invention. In particular, FIG. 2 illustrates a gas driven motor in three positions to illustrate the cooperative elements disclosed herein. As illustrated, gas driven motor 200, includes housing 202 that defines circulation chamber 204 and shutter chamber 206. Housing further includes intake port 208 through which gas enters as indicated by arrow 212 and exhaust port 210 through which gas exits as indicated by arrow 214. Further illustrated, in embodiments, intake port 208 may be positioned along an upper wall of shutter chamber 206 in a position corresponding with a sealing edge of shutter 224. Additionally, exhaust port 210 may be positioned along an upper portion of a circumferential wall of the circulation chamber 204. Gas driven motor 200 further includes drive axle 220 supported by a pair of parallel circulation chamber walls and rotatably attached thereto. In some embodiments, drive axles may be supported by a bearing, a bushing, a support block, and a pillow block without limitation. It may be appreciated that drive axle 220 is optimally positioned perpendicular or substantially perpendicular to the pair of parallel circulation chamber walls. Further, vane 222 may be mechanically coupled with drive axle 220 along an attaching edge. In embodiments, vane 222 is configured to rotate through circulation chamber 204 along an axis of rotation 230 in response to application of a gas flow. It may be further seen that vane side edges form a curve. The curve formed by vane side edges defines a surface that is illustrated in further detail below for FIG. 5. In addition, shutter 224 is illustrated and positioned along a pair of parallel shutter chamber walls and pivotally attached thereto along pivot axis 232. As illustrated shutter 224 pivots about axis 232. Any pivoting mechanism known in the art may be utilized without limitation and without departing from embodiments provided herein. In some embodiments, shutters may be attached at a pivot point and simply flex (as opposed to pivot) in response to actuation by a vane. In embodiments, shutters may be manufactured from any of a flexible material, a semi-flexible material, or a non-flexible material. Likewise, in embodiments, vanes may be manufactured from any of: flexible material, a semi-flexible material, or a non-flexible material.

As seen in position A, gas flow 212 enters intake port 208 to rotate vane 222. Further in position A, shutter 224 is in a closed position and forms at least a partial seal along drive axle 220 at a sealing edge. As may be seen, during vane rotations, gas flow 214 exits through exhaust port 210. As vane 222 rotates to position B, gas flow 212 continues entering intake port 208 to rotate vane 222. Further in position B, vane 222 has contacted shutter 224. As illustrated, vane 222 includes leading surface 222A and trailing surface 222B each following substantially the same curvature in the same orientation. As illustrated, shutter 224 is in contact with leading surface 222A. It may be more clearly understood that the curvature of the vane provides a suitable slope for gradually opening shutter 224. In addition, gas flow 214 continues exiting through exhaust port 210. As vane 222 rotates to position C, gas flow 212 continues entering intake port 204 to rotate vane 222. Further in position B, shutter 224 is in a partially open position and pivoting to a retracted position in shutter chamber 206. In addition, gas flow 214 continues exiting through exhaust port 210. As noted above for FIG. 1, a shutter may be utilized to separate a circulation chamber. One obstacle in providing shutter movement is the actuation of some mechanical element to move the shutter so that the vane may be unobstructed through the path the vane travels. In the illustrated embodiment, the vane may be curved to actuate the shutter.

FIG. 2B is an illustrative representation of a portion of an operational cycle for a gas driven motor 200 in accordance with embodiments of the present invention. In particular, FIG. 2B illustrates a gas driven motor in three positions to illustrate the cooperative elements disclosed herein. As seen in position D, gas flow 212 enters intake port 208 to rotate vane 222. Further in position D, shutter 224 is in a partially retracted position. In addition, gas flow 214 continues exiting through exhaust port 210. As vane 222 rotates to position E, gas flow 212 ceases entering intake port 208. It may be seen that shutter 224 is fully retracted into shuttle chamber 206. In addition, gas flow 214 ceases exiting through exhaust port 210. In this manner, vane 222 may pass unobstructed through circulation chamber 204. As vane 222 rotates to position F, gas flow 212 continues entering intake port 208. It may be seen that shutter 224 is fully extending into circulation chamber 202. In addition, gas flow 214 continues exiting through exhaust port 210.

FIG. 3 is an illustrative graphical representation 300 of shutter position and gas flow over drive axle rotational position of gas driven motors in accordance with embodiments of the present invention. It may be appreciated that in some embodiments, some process control may be desirable to improve gas drive motor efficiencies. In particular, referring to FIG. 2B position E, for example, at a point in the operation cycle, shutter embodiments may be in a fully retracted position. At that position, friction on a vane may be undesirably high when gas is flowing into the gas drive motor. It may, therefore, be desirable to limit friction through attenuated gas flow. Referring back to FIG. 3, as drive axle rotates through 360° as illustrated by axis 304, shutter position changes from retracted to extended as illustrated on axis 302 and by curve 310. At position A 312, a shutter is in a fully extended position (see for example FIG. 2A position B). In like manner, at position B 314, a shutter is in a fully retracted position (see for example FIG. 2B position E). It may be appreciated that curve 310 may be modified by the curvature of the vane without departing from embodiments and without limitation. Because friction may be increased on vane due to gas flow on shutter embodiments, gas flow may be shut off or reduced at high friction positions and turned on or increased following high friction positions. Thus, as drive axle rotates through 360° as illustrated by axis 304, gas flow changes from open to closed as illustrated on axis 302 and by curve 320. For example at position C 322, gas flow is on, while at position D 324, gas flow is off. As shown, gas flow is incrementally closed over a period of rotation. However, in some embodiments, gas flow may be simply switched on or off. In other embodiments, the slope of gas flow curves may be higher or lower within the operational parameters without limitation. In some embodiments, gas flow is continuous and requires no regulation.

Figure 4:
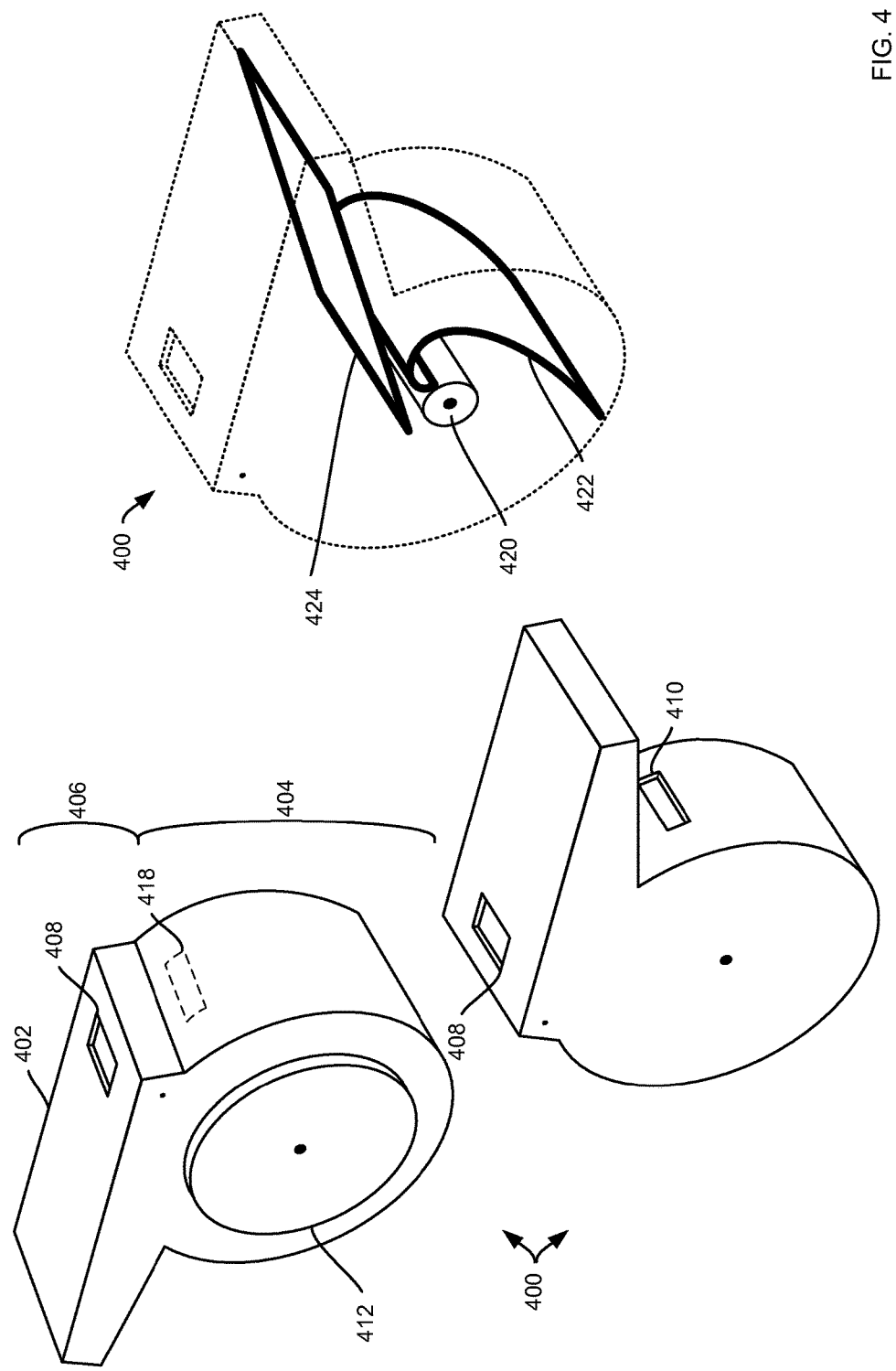
FIG. 4 is an illustrative representation of a gas driven motor in accordance with embodiments of the present invention.

FIG. 4 is an illustrative representation of a gas driven motor 400 in accordance with embodiments of the present invention. In particular, orthogonal views of gas driven motor are provided for clarity in understanding embodiments provided herein. As illustrated, gas driven motor 400, includes housing 402 that defines circulation chamber 404 and shutter chamber 406. Housing 402 further includes intake port 408 through which gas enters and exhaust port 410 through which gas exits. Further illustrated, in embodiments, intake port 408 may be positioned along an upper wall of shutter chamber 406 in a position corresponding with a sealing edge of shutter 424. Additionally, exhaust port 410 may be positioned along an upper portion of a circumferential wall of the circulation chamber 404. In some embodiments, intake port 418 may be alternately positioned along upper portions of a circumferential wall of circulation chamber 404 opposite exhaust port 410. Further illustrated is flywheel 412, which is exterior to housing 402 and mechanically coupled with drive axle 420. In some embodiments, flywheels may be enclosed within the housing (not shown) without limitation. Flywheels are well known in the art and may be utilized in any suitable size and dimension without limitation without departing from embodiments provided herein.

Further illustrated is vane 422 in embodiments, vanes include an attached edge where the vane is mechanically coupled with the drive axle. Vanes further include a leading edge that is parallel with and opposite to the attached edge. In some the leading edge forms at least a partial seal along a circumferential wall of the circulation chamber. Although the leading edge may form a partial seal, the leading edge should not impart excessive friction to the circumferential wall. In addition, vane embodiments include a pair of side edges that are parallel with respect to one another and form a matching curve with respect to one another as may be seen in the illustration. Further, vane include a curved surface defined by the pair of side edges, which curved surface may contact shutter 424 during rotation. In addition, side edges may form at least a partial seal with the pair of parallel circulation chamber walls. As above, although the side edges may form a partial seal, the side edges should not impart excessive friction to the pair of parallel circulation chamber walls.

Further illustrated is shutter 424. As illustrated, shutter 424 is in a fully extended position and includes a sealing edge for sealing against drive axle 420 and a pivoting edge parallel with and opposite to the sealing edge. Shutter 424 further includes a pair of shutter side edges that form at least a partial seal with the pair of parallel circulation chamber walls. As above, although the shutter side edges may form a partial seal, the shutter side edges should not impart excessive friction to the pair of parallel circulation chamber walls.

Figure 5:
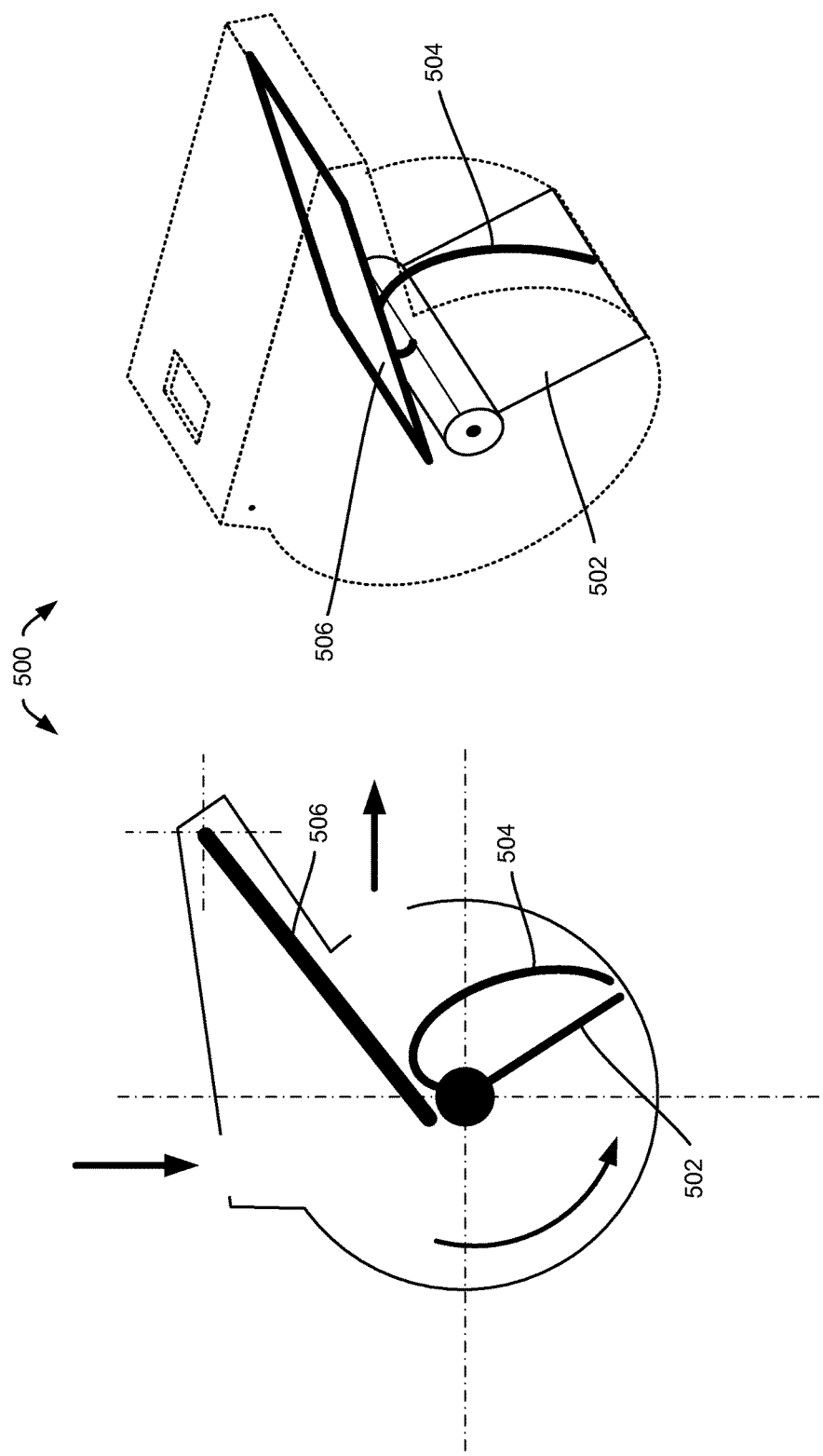
FIG. 5 is an illustrative representation of a gas driven motor in accordance with embodiments of the present invention.

FIG. 5 is an illustrative representation of a gas driven motor 500 in accordance with embodiments of the present invention. In particular, gas driven motor is illustrative alternate embodiment of a vane configuration. In operation, gas driven motor 500 performs in manner similar to embodiments described above. In addition, gas driven motor 500 includes planar vane 502 and curved wire 504. Curved wire 504 serves the function of actuating shutter 506. However, in this embodiments the reduced surface area of curved wire 504 and vane 502 may reduce significantly reduce friction and result in higher efficiency. As illustrated, a single curved wire is utilized, however, any number of curved wires or any other kind of "bumper" that can serve as a cam may be utilized without limitation and without departing from embodiments provided herein.

Figure 6:
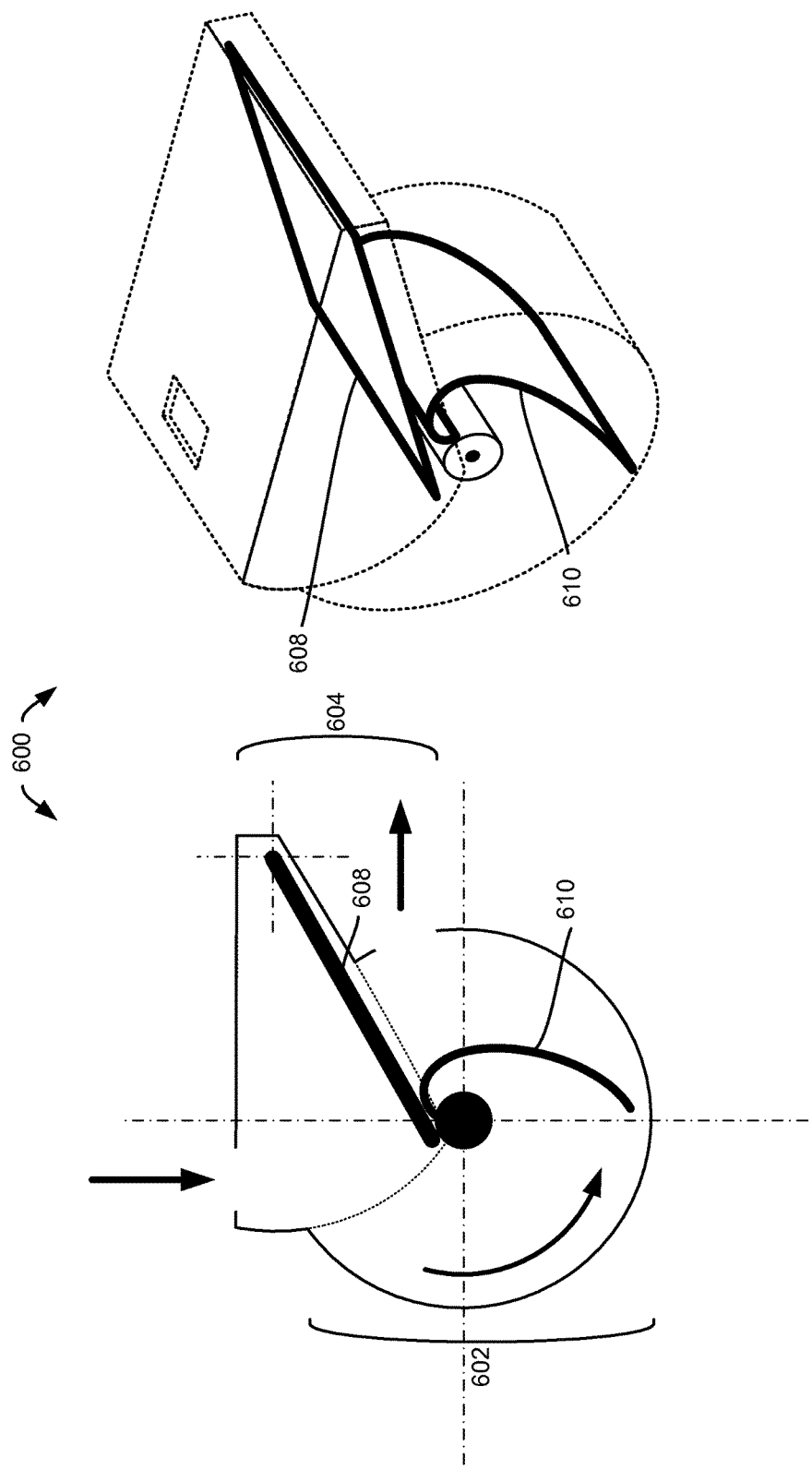
FIG. 6 is an illustrative representation of a gas driven motor in accordance with embodiments of the present invention.

FIG. 6 is an illustrative representation of a gas driven motor 600 in accordance with embodiments of the present invention. In particular, gas driven motor is illustrative alternate embodiment of a shutter chamber configuration. In operation, gas driven motor 600 performs in manner similar to embodiments described above. In addition, gas driven motor 600 includes vane 610 and shutter 608. Furthermore, gas driven motor 600 includes circulation chamber 602 and shutter chamber 604. In the embodiment provided, shutter chamber 604 is wider that circulation chamber 602. Embodiments in this configuration may benefit from reduced frictional constraint when retracting the shutter fully. The shutter can seal against the lip provided by shutter chamber 604 rather than sealing directly against the circulation chamber walls.

It may be appreciated that embodiments provided may be useful for high torque low pressure systems. In some embodiments gas flow may be provided at less than 100 p.s.i. In other embodiments gas flow may be provided at less than 50 psi. In still other embodiments gas flow may be provided at less than 20 p.s.i. Vanes disclosed herein may have increased surface area for fully maximizing gas flow contact area while the curvature of the vanes provide a relatively simple mechanism for actuating shutter embodiments. In addition, gas driven motors may be provided in any number of sizes or configurations without limitation. While the invention is mostly described as gas-driven, it can also be driven with a non-compressible liquid.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

Appendix (See Attached)

What is claimed is:

1. A non-combustion gas driven motor comprising:
   a housing defining a circulation chamber and a shutter chamber, wherein the housing includes an intake port and an exhaust port;
   a drive axle positioned along a pair of parallel circulation chamber walls and rotatably attached thereto, wherein the drive axle is perpendicular to the pair of parallel circulation chamber walls;
   a vane having an attached edge, a leading edge parallel with and opposite to the attached edge, and a pair of vane side edges, wherein
      the pair of side edges are parallel with respect to one another and form a matching curve with respect to one another, wherein
      the vane includes a curved surface defined by the pair of side edges, wherein
      the vane is mechanically coupled with the drive axle along the attached edge, and wherein
      the vane is configured to rotate through the circulation chamber along an axis of rotation in response to an application of a low pressure gas flow
      wherein the curved surface includes a leading surface and a trailing surface each following substantially the same curvature in the same orientation; and
   a shutter having a sealing edge, a pivoting edge parallel with and opposite to the sealing edge and a pair of shutter side edges, wherein
      the shutter is positioned along a pair of parallel shutter chamber walls and pivotally attached thereto, wherein
      the shutter pivotally extends into the circulation chamber in a first position, wherein the shutter pivotally retracts into the shutter chamber in a second position, wherein the shutter is configured to retract into the shutter chamber via mechanical communication with the leading surface of the vane along the sealing edge of the shutter, and wherein the shutter is configured to return to the first position when the sealing edge releases the leading surface and moves directly to the drive axle.

2. The motor of claim 1 further comprising:

a flywheel mechanically coupled with the drive axle.

3. The motor of claim 2, wherein the flywheel is enclosed within the housing.

4. The motor of claim 2, wherein the flywheel is exterior to the housing.

5. The motor of claim 1, wherein the intake port is positioned along an upper wall of the shutter chamber in a position corresponding with the sealing edge, and wherein the exhaust port is positioned along an upper portion of a circumferential wall of the circulation chamber.

6. The motor of claim 1, wherein the intake port and the exhaust port are oppositely positioned along upper portions of a circumferential wall of the circulation chamber.

7. The motor of claim 1, wherein the pair of vane side edges form at least a partial seal with the pair of parallel circulation chamber walls.

8. The motor of claim 1, wherein the leading edge forms at least a partial seal along a circumferential wall of the circulation chamber.

9. The motor of claim 1, wherein the sealing edge forms at least a partial seal along the drive axle.

10. The motor of claim 1, wherein the pair of shutter side edges form at least a partial seal with the pair of parallel circulation chamber walls.

11. The motor of claim 1, wherein the drive axle is mechanically supported by one of the group consisting of: a bearing, a bushing, a support block, and a pillow block.

12. The motor of claim 1, wherein the low pressure gas flow is less than approximately 100 p.s.i.

13. The motor of claim 1, wherein the low pressure gas flow is less than approximately 50 p.s.i.

14. The motor of claim 1, wherein the low pressure gas flow is less than approximately 20 p.s.i.

15. The motor of claim 1, wherein the vain and the shutter are manufactured from a material selected from the group consisting of: a flexible material, a semi-flexible material, and a non-flexible material.

* * * * *